(12) United States Patent
Valentine et al.

(10) Patent No.: US 10,585,168 B2
(45) Date of Patent: Mar. 10, 2020

(54) HIGH PROBABILITY OF INTERCEPT RADAR DETECTOR

(71) Applicant: Valentine Research, Inc., Cincinnati, OH (US)

(72) Inventors: Michael D. Valentine, Cincinnati, OH (US); Stephen R. Scholl, Cincinnati, OH (US); Richard L. Dickerson, Union, KY (US); Marwan E. Nusair, Cincinnati, OH (US)

(73) Assignee: Valentine Research Inc., Cincinnati, OH (US)

( * ) Notice: Subject to any disclaimer, the term of this patent is extended or adjusted under 35 U.S.C. 154(b) by 302 days.

(21) Appl. No.: 15/486,873

(22) Filed: Apr. 13, 2017

(65) Prior Publication Data

US 2017/0219688 A1    Aug. 3, 2017

Related U.S. Application Data

(62) Division of application No. 13/834,905, filed on Mar. 15, 2013, now Pat. No. 9,658,319.

(51) Int. Cl.
*G01S 7/02* (2006.01)
*G01S 13/28* (2006.01)

(52) U.S. Cl.
CPC ............ *G01S 7/022* (2013.01); *G01S 13/282* (2013.01); *G01S 7/021* (2013.01)

(58) Field of Classification Search
CPC ......... G01S 7/022; G01S 13/282; G01S 7/021
See application file for complete search history.

(56) References Cited

U.S. PATENT DOCUMENTS

| | | |
|---|---|---|
| 2,882,395 A | 4/1959 | White |
| 2,954,465 A | 9/1960 | White |
| 3,382,460 A | 5/1968 | Blitz et al. |
| 3,421,112 A | 1/1969 | Mortley et al. |
| 3,504,294 A | 3/1970 | Martin, Jr. |
| 3,675,163 A | 7/1972 | Hartmann et al. |
| 3,699,448 A | 10/1972 | Martin et al. |
| 3,729,738 A | 4/1973 | Cross et al. |
| 3,743,942 A | 7/1973 | Carpenter |

(Continued)

OTHER PUBLICATIONS

Windrich, Marcus E.; Office Action; U.S. Appl. No. 15/486,902, dated Apr. 29, 2019; United States Patent and Trademark Office; Alexandria, VA.

(Continued)

*Primary Examiner* — Marcus E Windrich
(74) *Attorney, Agent, or Firm* — Stevens & Showalter, L.L.P.

(57) ABSTRACT

Operating a police radar detector to suppress nuisance radar alerts due to received signals that are not police radar signals includes receiving electromagnetic signals; mixing received electromagnetic signals with a local oscillator signal that is swept at a constant sweep rate; and accumulating a virtual image of the signal environment represented by received electromagnetic signals. Analysis of the virtual image is performed for signals suspected of being nuisance signals that could result in nuisance radar alert so that any nuisance signals within the virtual image can be identified and ignored by the alarm portion of the police radar detector.

4 Claims, 10 Drawing Sheets

(56) References Cited

U.S. PATENT DOCUMENTS

| | | |
|---|---|---|
| 3,925,653 A | 12/1975 | Otto |
| 3,931,586 A | 1/1976 | Carpenter |
| 3,955,137 A | 5/1976 | Harrington et al. |
| 4,005,417 A | 1/1977 | Collins |
| 4,038,612 A | 7/1977 | Borofka et al. |
| 4,045,798 A | 8/1977 | Carré |
| 4,099,182 A | 7/1978 | Ward |
| 4,119,927 A | 10/1978 | Metteer et al. |
| 4,129,832 A | 12/1978 | Neal et al. |
| 4,131,852 A | 12/1978 | Holland-Moritz |
| 4,160,958 A | 7/1979 | Mims et al. |
| 4,166,980 A | 9/1979 | Apostolos et al. |
| 4,196,393 A | 4/1980 | Schweitzer |
| 4,200,840 A | 4/1980 | Tsui |
| 4,204,165 A | 5/1980 | Ready |
| 4,216,433 A | 8/1980 | LeGrand |
| 4,245,196 A | 1/1981 | Peebles, Jr. et al. |
| 4,247,939 A | 1/1981 | Stromswold et al. |
| 4,263,676 A | 4/1981 | Liebel |
| 4,270,209 A | 5/1981 | Albanese |
| 4,305,159 A | 12/1981 | Stromswold et al. |
| 4,336,511 A | 6/1982 | Stromswold et al. |
| 4,342,007 A | 7/1982 | Elliott |
| 4,346,480 A | 8/1982 | Poston et al. |
| 4,349,789 A | 9/1982 | Kurihara |
| 4,417,218 A | 11/1983 | Berke |
| 4,435,712 A | 3/1984 | Kipp |
| 4,499,435 A | 2/1985 | Thomson et al. |
| 4,528,567 A | 7/1985 | Miles et al. |
| 4,546,328 A | 10/1985 | Smith et al. |
| 4,593,287 A | 6/1986 | Nitardy |
| 4,603,305 A | 7/1986 | McCune |
| 4,613,865 A | 9/1986 | Hoffman |
| 4,647,873 A | 3/1987 | Beckner et al. |
| 4,656,642 A | 4/1987 | Apostolos et al. |
| 4,701,762 A | 10/1987 | Apostolos |
| 4,704,737 A | 11/1987 | Estrick et al. |
| 4,733,237 A | 3/1988 | Apostolos et al. |
| 4,754,277 A | 6/1988 | Voyce |
| 4,862,175 A | 8/1989 | Biggs et al. |
| 4,870,420 A | 9/1989 | Apostolos |
| 4,888,787 A | 12/1989 | Kisak |
| 5,029,235 A | 7/1991 | Apostolos et al. |
| 5,079,735 A | 1/1992 | Apostolos |
| 5,151,701 A * | 9/1992 | Valentine ............... G01S 7/022 342/20 |
| 5,168,214 A | 12/1992 | Engeler et al. |
| 5,172,123 A | 12/1992 | Johnson |
| 5,210,539 A | 5/1993 | Voyce |
| 5,220,683 A | 6/1993 | Rudish |
| 5,239,555 A | 8/1993 | Konig |
| 5,280,289 A | 1/1994 | Root |
| 5,341,141 A | 8/1994 | Frazier et al. |
| 5,343,207 A | 8/1994 | Stromswold et al. |
| 5,379,001 A | 1/1995 | Hedtke |
| 5,379,456 A | 1/1995 | Papadopoulos |
| 5,394,153 A | 2/1995 | Borofka |
| 5,424,631 A | 6/1995 | Ward |
| 5,463,342 A | 10/1995 | Guard |
| 5,557,241 A | 9/1996 | Burke |
| 5,559,508 A | 9/1996 | Orr et al. |
| 5,642,066 A | 6/1997 | Burke |
| 5,852,417 A * | 12/1998 | Valentine ............... G01S 7/022 342/20 |
| 5,900,832 A | 5/1999 | Valentine et al. |
| 5,901,348 A | 5/1999 | Bang et al. |
| 5,917,441 A * | 6/1999 | Valentine ............... G01S 7/022 342/20 |
| 6,097,331 A | 8/2000 | Matsugatani et al. |
| 6,256,485 B1 | 7/2001 | Heard |
| 6,317,075 B1 | 11/2001 | Heide et al. |
| 6,400,305 B1 | 6/2002 | Kuhn |
| 6,677,883 B2 | 1/2004 | Apostolos |
| 6,683,561 B1 | 1/2004 | Tait et al. |
| 6,967,626 B2 | 11/2005 | Apostolos |
| 7,061,423 B1 * | 6/2006 | Valentine ............... G01S 7/022 342/100 |
| 7,215,276 B2 | 5/2007 | Batten et al. |
| 7,450,051 B1 * | 11/2008 | Valentine ............... G01S 7/022 342/115 |
| 9,658,319 B2 | 5/2017 | Valentine et al. |
| 2007/0018879 A1 | 1/2007 | Batten et al. |
| 2007/0247366 A1 * | 10/2007 | Smith ..................... G01S 5/021 342/464 |
| 2011/0241923 A1 | 10/2011 | Chernukhin |
| 2012/0086594 A1 | 4/2012 | Steinbuch |

OTHER PUBLICATIONS

Windrich, Marcus E.; Office Action; U.S. Appl. No. 15/486,873, dated Apr. 4, 2019; U.S. Patent and Trademark Office; Alexandria, VA.

Windrich, Marcus E.; Office Action; U.S. Appl. No. 13/834,905, dated Sep. 10, 2015; United States Patent and Trademark Office; Alexandria, VA.

Windrich, Marcus E.; Final Office Action; U.S. Appl. No. 13/834,905, dated Apr. 1, 2016; United States Patent and Trademark Office; Alexandria, VA.

Related U.S. Appl. No. 15/486,902; entitled "High Probability of Intercept Radar Detector"; filed Apr. 13, 2017 by Michael D. Valentine; United States Patent and Trademark Office; Alexandria, VA.

Related U.S. Appl. No. 15/486,852; entitled "High Probability of Intercept Radar Detector"; filed Apr. 13, 2017 by Michael D. Valentine; United States Patent and Trademark Office; Alexandria, VA.

* cited by examiner

FIG. 2D
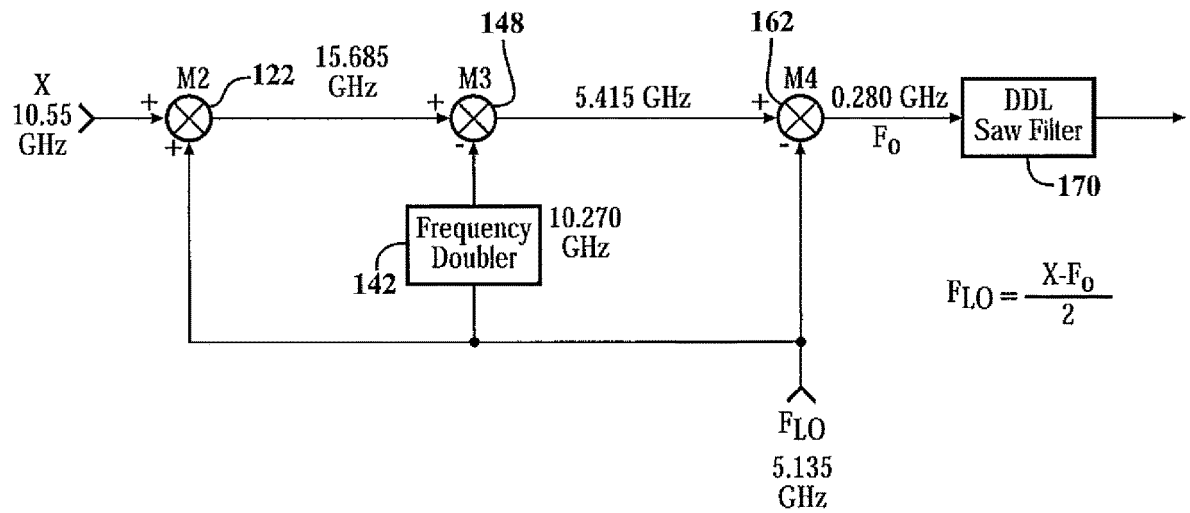
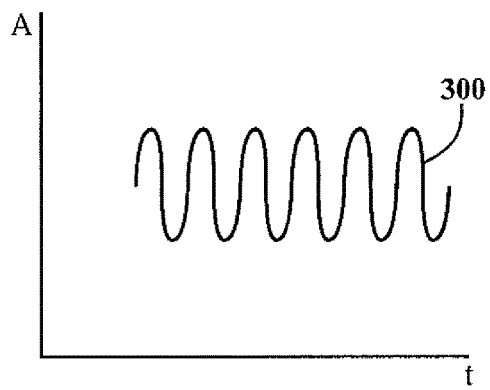
FIG. 3A
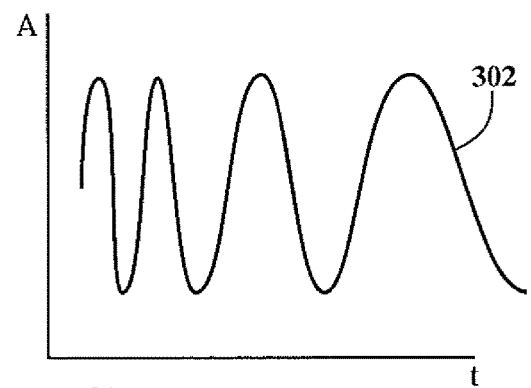
FIG. 3B
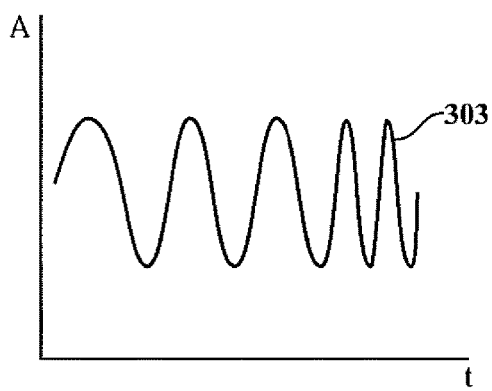
FIG. 3C
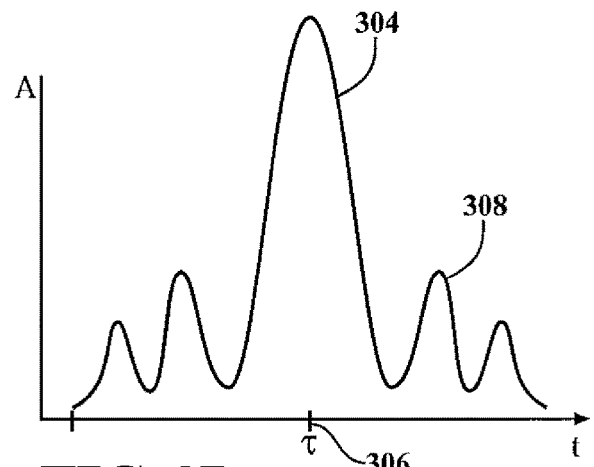
FIG. 3D

HIGH PROBABILITY OF INTERCEPT RADAR DETECTOR

RELATED APPLICATIONS

The present application is a divisional of, and claims benefit from, U.S. application Ser. No. 13/834,905, filed Mar. 15, 2013, entitled HIGH PROBABILITY OF INTERCEPT RADAR DETECTOR, the contents of which are incorporated herein by reference in their entirety.

FIELD OF THE INVENTION

The present invention relates generally to police radar detectors used in motor vehicles and, more particularly, to decreasing detector sweep time when detecting radar signals.

BACKGROUND

Conventional radar detectors almost universally employ scanning super-heterodyne receiver architectures. To achieve good sensitivity with lower cost, conventional radar detectors tend to sweep relatively slowly, often requiring several tenths of a second to sweep a covered spectrum. As a result, some radar gun manufacturers have developed radar gun designs that transmit very brief pulses as a technique for avoiding detection. The brief transmission is of a relatively short duration and may be conveniently referred to as a "POP transmission" which is a phrase coined and trademarked by MPH Industries. A detector with sweep periods lasting several tenths of a second is likely to entirely miss a radar gun transmission that lasts only in the neighborhood of no more than several tens of milliseconds. One approach for a detector design may involve sweeping the spectrum much faster to try to intercept these brief transmissions. In this way, the detector will tune through the transmission frequency during the interval that the radar signal is actually present. However, this approach will greatly increase the required bandwidth of the detector's receiver. Because the received signal power remains unchanged in the increased bandwidth, the signal-to-noise ratio degrades and a commensurate decrease in threshold sensitivity occurs.

Thus, there remains a need for another approach to reliably detecting these brief radar gun transmissions that avoids undue loss of the signal-to-noise ratio.

SUMMARY

One aspect of the present invention relates to a police radar detector for suppressing nuisance radar alerts due to received signals that are not police radar signals, the detector includes a receiver configured to receive electromagnetic signals; a mixer configured to combine received electromagnetic signals with a local oscillator signal that is swept at a constant sweep rate; and a memory configured to store a virtual image of the signal environment represented by received electromagnetic signals. The detector also includes a signal analyzer, coupled with the memory, and configured to analyze said virtual image for signals suspected of being nuisance signals that could result in nuisance radar alerts. The signal analyzer is configured to identify nuisance signals within said virtual image and there is an alarm coupled with the signal analyzer and configured to ignore identified nuisance signals.

Another aspect of the present invention relates to a police radar detector for rejecting an undesired intermediate frequency image signal that could interfere with receiving and detecting a desired police radar signal, includes a first antenna configured to receive an input signal, the input signal comprising a continuous wave emission within a frequency spectrum spanning approximately 3 GHz between a first input frequency to a second input frequency, and a local oscillator configured to sweep a signal through a range of frequencies from a first local oscillator frequency to a second local oscillator frequency in a predetermined time period so as to produce a local oscillator signal. The detector also includes a mixer configured to combine the input signal from the first antenna with the local oscillator signal to produce an output signal having an intermediate frequency, a dispersive delay line filter configured to filter the output signal to produce a filtered output signal; and a signal analyzer configured to determine a pulse shape of the filtered output signal. The signal analyzer is further configured to determine whether the input signal from the first antenna includes the desired police radar signal based on the pulse shape of the filtered output signal.

One other aspect of the present invention relates to a method of operating a police radar detector to suppress nuisance radar alerts due to received signals that are not police radar signals. This method includes receiving electromagnetic signals; mixing received electromagnetic signals with a local oscillator signal that is swept at a constant sweep rate; accumulating a virtual image of the signal environment represented by received electromagnetic signals; analyzing said virtual image for signals suspected of being nuisance signals that could result in nuisance radar alerts; identifying nuisance signals within said virtual image; and ignoring identified nuisance signals.

One more aspect of the present invention relates to a method of operating a police radar detector to reject an undesired intermediate frequency image signal that could interfere with receiving and detecting a desired police radar signal. This method includes receiving an input signal from a first antenna, the input signal comprising a continuous wave emission within a frequency spectrum spanning approximately 3 GHz between a first input frequency to a second input frequency; and sweeping a local oscillator signal through a range of frequencies from a first local oscillator frequency to a second local oscillator frequency in a predetermined time period. The method continues with mixing the input signal from the first antenna with the local oscillator signal to produce an output signal having an intermediate frequency; filtering the output signal using a dispersive delay line filter to produce a filtered output signal; determining a pulse shape of the filtered output signal; and determining that the input signal from the first antenna includes the desired police radar signal based on the pulse shape of the filtered output signal.

BRIEF DESCRIPTION OF THE DRAWINGS

While the specification concludes with claims particularly pointing out and distinctly claiming the present invention, it is believed that the present invention will be better understood from the following description in conjunction with the accompanying Figures, in which like reference numerals identify like elements, and wherein:

FIG. 2D depicts major components of the X-band signal path from the front antenna of the radar signal detector of FIG. 1B.

FIG. 3A depicts an exemplary continuous wave radar signal such as those emitted from a police radar gun.

FIG. 3B and FIG. 3C depict, respectively, a linear down-chirp signal and a linear up-chirp signal in accordance with the principles of the present invention.

FIG. 3D depicts a compressed pulse resulting from propagating a linear chirp signal through a matched filter in accordance with the principles of the present invention.

DETAILED DESCRIPTION

Figure 1A:
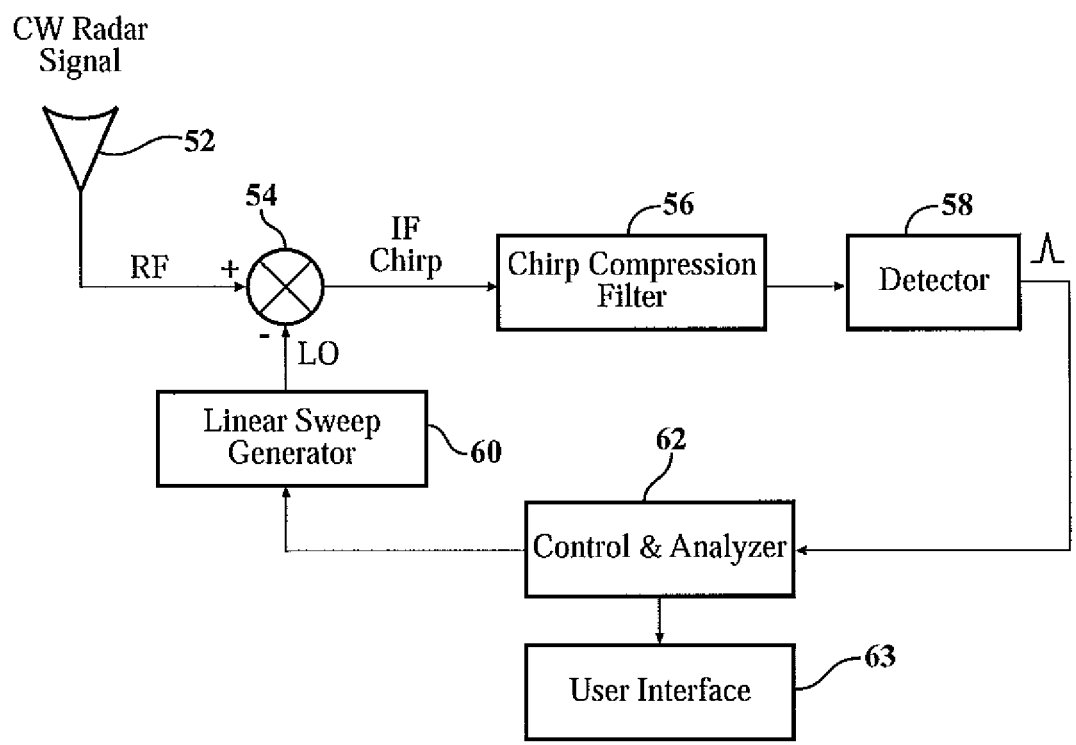
FIG. 1A depicts a block-level diagram of a radar search receiver with chirp compression.

In the following detailed description of the preferred embodiment, reference is made to the accompanying drawings that form a part hereof, and in which is shown by way of illustration, and not by way of limitation, specific embodiments in which the invention may be practiced. It is to be understood that other embodiments may be utilized and that changes may be made without departing from the spirit and scope of the present invention.

An inherent property of a matched filter is that it has an impulse response that is a time-reversed replica of the desired signal (plus a time delay required for causality). In a wideband search application using a compressive receiver design similar to one as described below, one example desired signal structure is a linear chirp. Compressive receiver design may reasonably begin with selection of a compressive filter since it is one of the most challenging receiver components. One example compressive filter type is a dispersive delay line (DDL) surface acoustic wave (SAW) filter which is generally fabricated to have an impulse response that is a down-chirp rather than an up-chirp because the down-chirp devices tend to deliver better performance (e.g. lower loss) than do up-chirp devices.

Assuming selection of a DDL SAW filter having the favored down-chirp impulse response, the matched-signal input would be an up-chirp and accordingly the receiver design would include an oscillator swept so as to deliver up-chirps of the proper rate to an input of the DDL SAW filter.

An example super-heterodyne receiver architecture described below linearly sweeps the local oscillator (LO) to down-convert received continuous wave radio frequency (CW RF) signals into linear up-chirps at the receiver's intermediate frequency (IF) output (i.e. the matched filter input). In one example embodiment described herein, the receiver's RF frequency conversion conforms to the formula: IF=RF−N*LO where N=2, 3, 5, 7 to sweep X, Ku, K, and Ka, respectively. Therefore, to deliver signal up-chirps at the IF, the LO generates down-chirps. One of ordinary skill will recognize opposite behavior can be designed and accomplished if the compressive filter conversely has an input response that happens to be an up-chirp.

By way of example, a receiver design may include a DDL filter that has a matched signal input chirp rate of $+3.5 \times 10^{12}$ Hz/s, with center frequency of 280 MHz. In accordance with matched-filter theory, the filter's impulse response is a burst down-chirp centered at 280 MHz, with a chirp rate of $-3.5 \times 10^{12}$ Hz/s. The duration of the impulse-response burst is established by specifying the required dispersive time-delay length of the filter. This dispersive delay, or dispersive time-delay length, is the differential delay between the travel times of the frequency extremes of the DDL filter. The acoustic velocity on a surface of a SAW is essentially constant for all frequencies; however, the effective path length to an array of resonators metalized on the surface varies with frequency. Thus, constant velocity over varying lengths gives rise to varying delay times for different frequencies. Subsequent description refers to "delay" for convenience, but it should be understood that dispersive time-delay length is the salient parameter under discussion. The bandwidth of the impulse burst is simply the dispersive time-delay length times the chirp rate and this bandwidth can also be characterized as the signal bandwidth of the filter. The dispersive time-delay length is one performance parameter of the filter that governs the amount of signal energy that can be captured by the filter and, thus, governs the filter's performance advantage. In principle, a receiver's performance improves with an increase in the time-delay length of the filter. For example, a filter having a dispersive time-delay length between about 2 μs to about 20 μs provides beneficial results in the frequency ranges typically encountered with police-band radar signals. In particular, an example dispersive time-delay length of 4 μs is used in an example design described below to help facilitate understanding of the principles of the present invention.

FIG. 1A depicts a block-level diagram of a radar search receiver with chirp compression. For clarity, intermediate components such as filters and amplifiers are omitted from the idealized diagram of FIG. 1A. A continuous wave radar signal is received by an antenna 52 and is fed, as signal "RF" to a mixer 54. An example of such a signal is depicted in FIG. 3A which shows a fixed frequency signal pulse 300 over a period of time.

Figure 4A:
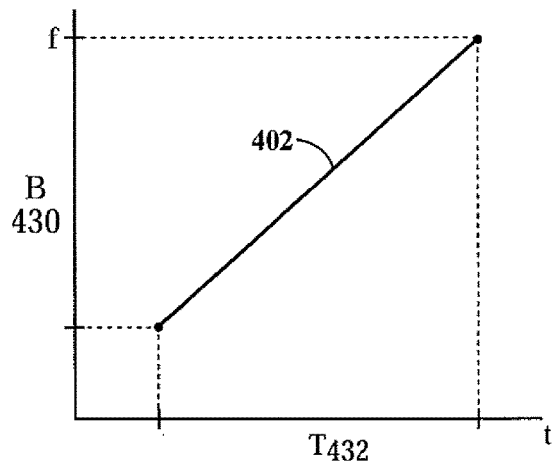
FIG. 4A depicts a conceptual graph of an up-chirp.
Figure 4B:
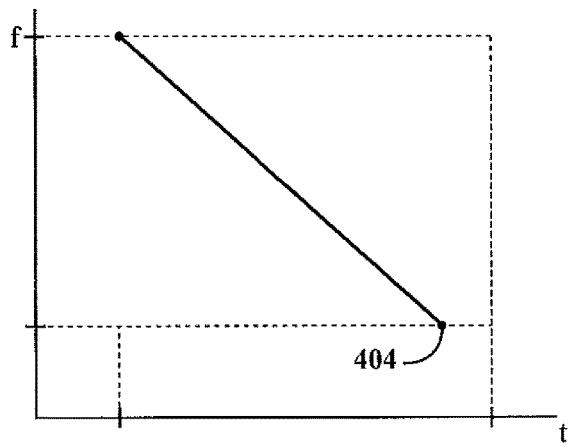
FIG. 4B depicts a conceptual graph of a down-chirp.

Another input to the mixer 54 is a swept local oscillator signal or "LO" signal generated by a linear sweep generator 60. The linear sweep generator 60 generates a signal whose frequency changes in a linear fashion over time. If the frequency of the generated signal increases as time progresses, then this is conveniently referred to as an "up-chirp". If the generated signal decreases in frequency as time progresses, then this is conveniently referred to as a "down-chirp". As used herein, a down-chirp signal may be described as having a chirp rate of X Hz/s because the term "down-chirp" provides an indication that the chirp rate frequency is decreasing at a rate having a magnitude of X Hz/s. Equivalently, for clarity, a down-chirp signal, even when identified as a "down-chirp", can be described as having a chirp rate of −X Hz/s as a way to emphasize its decreasing rate. FIG. 3B depicts a down-chirp sweep signal 302 that may be produced by the linear sweep generator 60 and FIG. 3C conversely depicts an example up-chirp sweep signal 303. FIGS. 4A and 4B depict respective chirp signals as a graph of frequency versus time. The signal of FIG. 4A is an up-chirp signal with a positive chirp rate 402 that produces an increasing frequency as time progresses; while the signal of FIG. 4B is a down-chirp signal with a negative chirp rate 404 that produces a decreasing frequency as time progresses.

When the RF signal and the LO signal are combined at the mixer 54, then the RF signal is frequency shifted by the instantaneous frequency of the LO signal. In particular, mixing an RF signal having a frequency $f_{RF}$ and a LO signal having a frequency $f_{LO}$ produces two different signals at a respective intermediate frequency. One of the produced signals will have an intermediate frequency of $f_{RF}+f_{LO}$ and the other produced signal will have an intermediate frequency of $f_{RF}-f_{LO}$. In FIG. 1A, the "minus" sign next to mixer's input for the LO signal indicates that the filter of FIG. 1A happens to pass $f_{IF}=f_{RF}-f_{LO}$. It should also be noted that $f_{IF}$ is proportional to $-f_{LO}$; as a result, a down-chirping LO will be reflected as an up-chirping signal in the IF chirp output.

When a continuous wave signal such as that in FIG. 3A is mixed with a down chirp signal as shown in FIG. 3B, the resulting signal, "IF CHIRP", from the mixer 54 will be an up-chirp signal similar to the signal 303 of FIG. 3C. A filter 56 is selected that is a matched filter with respect to the shape of the IF CHIRP signal. As described earlier, a matched filter is one that has an impulse response with exactly the same shape as its input signal but reversed in time with an added delay related to the duration of the input signal.

Chirp signals are characterized by a chirp rate, as shown in FIGS. 4A and 4B. For example, the linear sweep generator 60 may produce a signal whose frequency linearly changes at a rate of −3.5 MHz/μs. Equivalently, this signal would have a chirp rate of $-3.5 \times 10^{12}$ Hz/s. The inverting arrangement of the mixer 54 results in the signal at the IF output (i.e., the desired signal) having a chirp rate of $3.5 \times 10^{12}$ Hz/s. As for matched filter selection, the matched filter impulse response for a chirp signal is itself a chirp signal having the same magnitude but with an opposite sign than that of the desired signal. Accordingly, for the example signal just described, the matched filter would have an impulse response chirp rate of $-3.5 \times 10^{12}$ Hz/s; alternately stated, the filter's matched signal is an up-chirp at $3.5 \times 10^{12}$ Hz/s, precisely what is delivered by the sweep generator/mixer combination. This particular chirp rate is provided merely by way of example and other chirp rates having different magnitudes, either greater than or less than $3.5 \times 10^{12}$ Hz/s, are contemplated as well.

The result of the up-chirp linear FM chirp signal 303 propagating through the matched chirp compression filter 56 will be a compressed pulse similar in shape to the signal 304 of FIG. 3D. In particular, the signal 304 is a sinc waveform having a peak occurring at a particular time T 306 that is based on the frequency of the RF signal. Accordingly, a detector 58 can detect an occurrence of a peak in the signal 304 and convey this occurrence to control and analyzer circuitry 62. The control and analyzer circuitry 62 can then determine if the detected signal is likely a received radar transmission and also determine the frequency of that radar transmission. The control and analyzer circuitry 62 can also be coupled with the linear sweep generator 60 to control the LO waveform that is being provided to the mixer 54.

Additionally, a user interface 63 can include audible or visual indicators that are representative of the signals being received and detected as well as allow a user to select different operating characteristics of the device of FIG. 1A.

Applying these principles to the detection of radar gun transmissions, there is a continuous wave signal at an unknown frequency somewhere in the radar bands, a spectrum that can total about 3 GHz. A super-heterodyne receiver remains a viable technique for scanning through this wide spectrum. As a result, the received RF signal will be down-converted to an intermediate frequency signal that is a linear chirp. Thus, a matched filter will also have an impulse response that is a linear chirp. Such a matched filter can be realized as a dispersive delay line acting as a receiving filter. In this configuration of a receiving filter, as the intermediate frequency chirp propagates through the dispersive delay line, the delay line accumulates the energy in the matching chirp during the several microseconds the signal is present within the delay line. The delay line acts to compress the matched chirp and delivers the stored energy as a narrow output pulse only a few tens of nanoseconds wide.

Figure 1B:
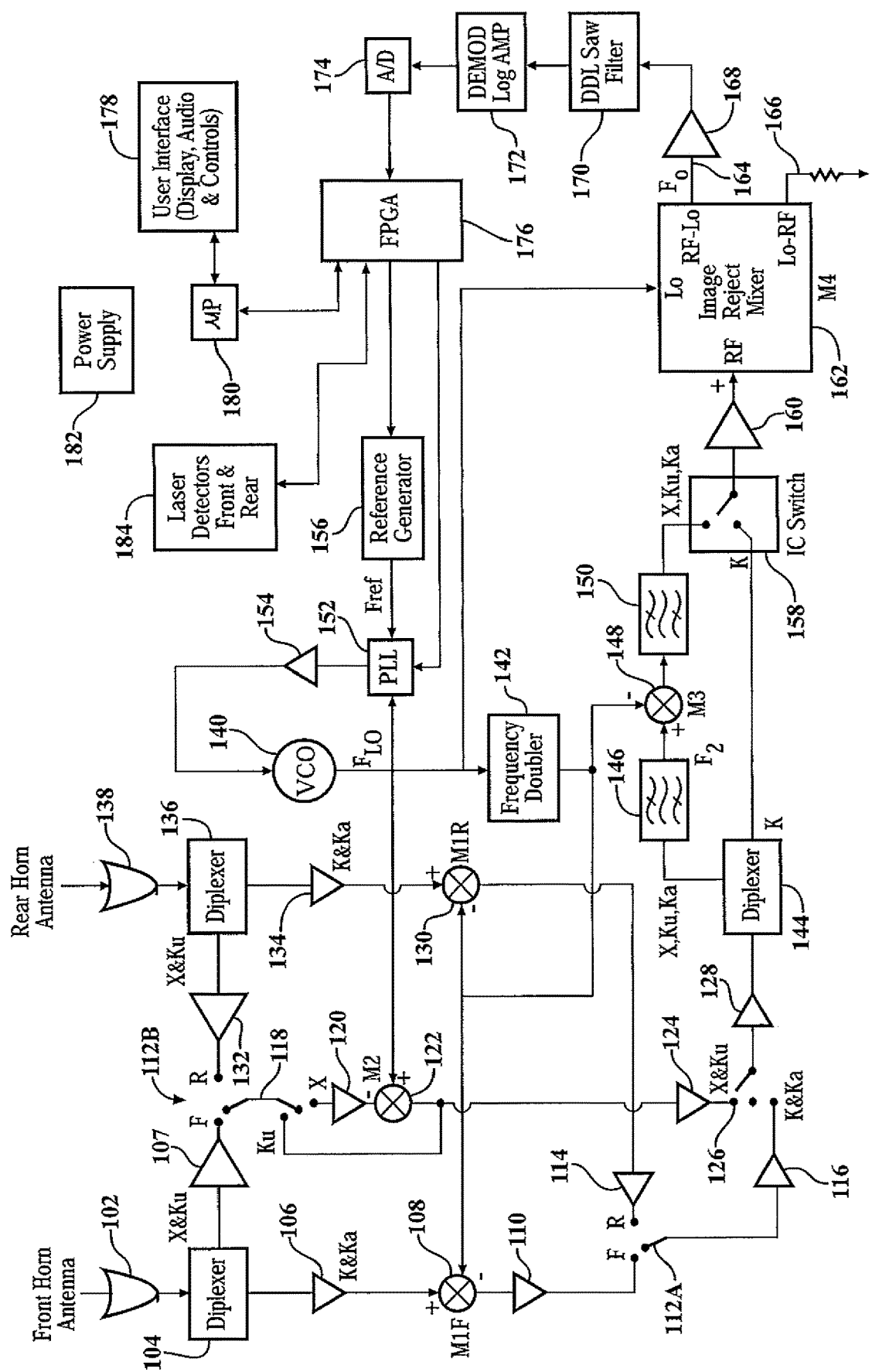
FIG. 1B depicts a block-level diagram of portions of a radar signal detector in accordance with the principles of the present invention.

A matched filter which captures as much signal energy as possible provides the best sensitivity. However, in practice, a radar detector is desired that will intercept very brief radar pulses and, thus, a sweep chirp rate should be fast enough to cover the entire spectrum in less than the length of a POP transmission. The length of a POP transmission may, for example, be about 16 ms. In this example, the entire sweep cycle should be completed in less than 16 ms to ensure interception of the limited duration POP transmission. This principle should govern irrespectively of the number of antennae employed or the number of radar bands swept. To elaborate, for reasons of economy, it may be desirable to share the DDL filter and other receiver circuitry sequentially amongst multiple bands and/or antennae. Receiver sensitivity might have to be compromised commensurately, but completing the sweep cycle often enough to ensure POP signal interception should be the guiding constraint. These considerations will be evident to those having ordinary skill. Some circumstances may motivate sweeping faster than 16 ms. If both a front and rear antenna are considered, in a sequential manner, then the sweep should be able to be performed in less than 8 ms. If multiple sweeps are desired in order to identify spurious signals or false alarms, then even faster sweep rates are beneficial. FIG. 1B depicts a block-level diagram of portions of a radar signal detector in accordance with the principles of the present invention. There are three particular radar bands that it is typically desirable to sweep through in order to detect radar gun transmissions. The X-band center is nominally at 10.525 GHz but a desirable sweep will include the range of 10.49-10.56 GHz; The K-band center is nominally at 24.150 GHz but a desirable sweep will include the range of 24.035-24.265 GHz; and the Ka-band center is nominally at 34.7 GHz but a desirable sweep will include the range of 33.35-36.08 GHz. A fourth band may also be swept: the Ku-band center is nominally at 13.45 GHz but a desirable sweep will include the range of 13.38-13.52 GHz. These frequencies encompass the FCC allocated police radar bands plus modest "over-scan" for safety.

The diagram of FIG. 1B shows different switches (e.g., 112A, 112B, 118, 126, 158) that define the signal path through the radar signal detector at a particular time. These switches may be implemented in a variety of different ways without departing from the scope of the present invention. For example, one or more of the switches may be a transistor having its gate voltage set so as to be transmissive or non-transmissive in a given direction or various switches can be functionally achieved by activating a bias on amplifiers in a desired path and deactivating amplifiers in unwanted paths. The microprocessor 180 and/or field programmable gate array (FPGA) 176, or similar control circuitry, can control the switches so as to select a current signal path and, thereby, select a particular band of radar signals of interest at a particular time.

When considering signals arriving at a front antenna 102, the switches 112A and 112B will select the appropriate signal path. Thus, an RF signal at the front antenna 102 will pass to the diplexer 104 and be split into K-band and Ka-band frequencies on one path and X-band and Ku-band frequencies on a different path. The K-band and Ka-band frequencies can be amplified by an amplifier 106 and mixed with a local oscillator based signal at a mixer M1F 108. The output of the mixer 108 can be amplified by amplifiers 110, 116, and 128 before propagating to another diplexer 144. At the diplexer 144, the K-band signals are separated from the Ka-band signals. K-band signals pass through the switch 158 and are amplified by an amplifier 160 before being mixed, at a mixer M4 162, with a local oscillator signal from the voltage controlled oscillator 140. The output $F_O$ 164 of the mixer M4 162 is amplified by an amplifier 168 and propagated to a dispersive delay line filter 170. One of ordinary skill will recognize that the different bands can be combined and separated in ways that are different than those of FIG. 1B. For example, the K-band signals could be handled by a separate signal path while the Ka and X-band signals can be in a combined path from which they are alternately selectable.

At the diplexer 144, the desired band of signals could have been in the Ka-band which would have resulted in Ka-band signals being propagated from the diplexer 144 to a band-pass filter 146 and mixed, at a mixer M3 148, with a local oscillator based signal. The output from the mixer M3 148 can be filtered with another band-pass filter 150 and can then pass through the switch 158 to the amplifier 160 where it is then mixed in the mixer M4 162 with a local oscillator signal from the voltage controlled oscillator 140. The output $F_O$ 164 from the mixer M4 162 can then be amplified using the amplifier 168 and propagated to the filter 170. At the mixer M4 162, an image signal 166 can be rejected by, for example, being shunted to ground or other known techniques.

Returning to diplexer 104, the other path is for received RF signals in either the X-band or the Ku-band. Signals in either of these bands may be amplified by an amplifier 107 and then a switch 118 can direct Ku-band signals directly to an amplifier 124 or can direct X-band signals to an amplifier 120. The output of the amplifier 120 is mixed at mixer M2 122 with the local oscillator signal from the voltage controlled oscillator 140 and propagated to the amplifier 124. A switch 126 can connect the output from the amplifier 124 to the amplifier 128 so that the diplexer 144 can direct the X-band and Ku-band signals to the band-pass filter 146 and from there to the mixer M3 148. At the mixer M3 148, the output from the filter 146 and a local oscillator based signal are mixed and propagated to the band-pass filter 150. The output from the filter 150 passes through the switch 158, the amplifier 160, the mixer M4 162, and the amplifier 168 to arrive at the filter 170.

When considering signals received by a rear antenna 138, similar signal paths are provided for each of the different bands of signals in the covered spectrum. However, these alternative signals paths utilize a diplexer 136, various amplifiers 132, 134, and 114, and a mixer M1R 130.

The circuit arrangement of FIG. 1B utilizes a single voltage controlled oscillator 140 to produce a local oscillator signal $F_{LO}$. As is known in the art, a reference voltage generator 156, phase lock loop 152, and amplifier 154 work in conjunction with the voltage-controlled oscillator 140 to produce a linear sweep signal having desired characteristics for the band of signals being detected at a given moment. The signal $F_{LO}$ may be doubled by a frequency doubler 142 and provided to various ones of the mixers (e.g., M1F, M1R, M3).

The microprocessor 180 and/or the FPGA 176 coordinates frequency control and receiver band switching. In particular, as mentioned, the frequency of the VCO 140 is controlled by the PLL 152 and reference generator 156. An example reference generator 156 may be a direct digital synthesizer (DDS) that generates a dynamically varying reference input to the PLL 152. The PLL 152, in turn, is used to frequency multiply the reference input to an appropriate frequency for $F_{LO}$. Example devices may be Analog Devices AD9913 and ADF4106 for the DDS and PLL, respectively. Alternatively, Analog Devices ADF4158 may be used as the reference generator 156 that is capable of synthesizing sweep waveforms.

Ultimately, a received signal from any of the bands and from either the front or rear antenna will be propagated to the dispersive delay line filter 170. This filter can be implemented using a surface acoustic wave device or by digitizing the IF with an analog-to-digital converter and processing with an appropriately programmed digital signal processor. As will be discussed in more detail below, the filter 170 is a filter that is matched with the shape of the signal $F_O$ produced as described above. The filter 170 produces an output that is detected by a demodulating log amplifier 172. The output of the log amplifier 172 is continuously digitized by a high-speed analog-to-digital converter 174 and input to the FPGA 176. The FPGA 176 digitally processes this input and determines if the output from the converter 174 exceeds a noise floor sufficiently to be deemed a real, detected signal.

An algorithm within the FPGA 176 may dynamically quantify the noise floor so that a detection threshold can adapt to fluctuations in noise power as the bands are being swept. When the FPGA 176 recognizes a signal, it stores (for example, in a FIFO buffer) the signal's peak amplitude as a measure of signal strength and attaches a timing "tag" that indicates the time when the peak was detected. If a side lobe 308 is falsely considered to be a detected pulse, then the pulse waveform 304 of FIG. 3D may inaccurately be detected as multiple closely-spaced signals. Accordingly, the FPGA 176 may use a detection window approach to avoid inaccurate results. The detection window is a period of time during which the FPGA 176 monitors the output from the converter 174 to search for the peak amplitude. In one embodiment, the FPGA 176 dynamically analyzes the converter output to determine when a pulse is over. A simpler approach is to have a fixed-size detection window wherein the window size is based on the expected pulse width at large signal strengths and a desired resolution of nearby signals.

The detector of FIG. 1B may also include a laser detector 184. In particular, the laser detector 184 can include a front sensor and a rear sensor for detecting police LIDAR signals. A power supply 182 can be included to ensure sufficient electrical power for all the components and a microprocessor 180 can be included to control the operation and timing of the appropriate elements of the detector of FIG. 1B.

In FIG. 1B, the radar signal detector was depicted in such a way as to highlight how a single local oscillator 140 is used to produce all of the mixer signals for all of the radar bands in the covered spectrum. This scheme offers a number of advantages with respect to hardware efficiency. Especially advantageous is the avoidance of multiple fixed LOs and their propensity to generate problematic mixing products that result in internal spurious signals. However, it should be obvious that numerous other receiver frequency schemes could be adopted without departing from the spirit of the invention.

Figure 2A:
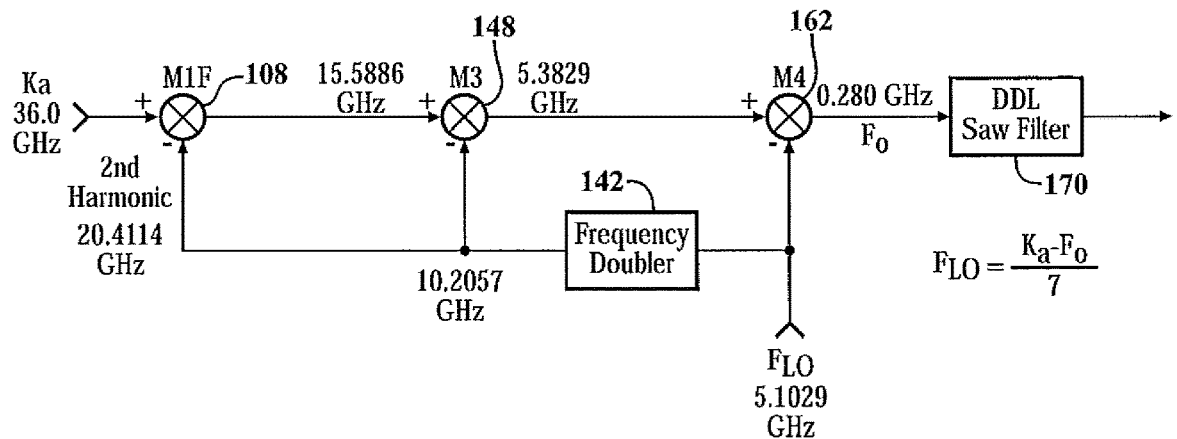
FIG. 2A depicts major components of the Ka-band signal path from the front antenna of the radar signal detector of FIG. 1B.

To explain operation of the circuitry in FIG. 1B, FIGS. 2A-2D are provided below to isolate each signal path for a respective band of radar signals. In these figures, the various switches, amplifiers, and filters have been omitted for clarity. For each radar band, the VCO 140 produces an appropriately swept $F_{LO}$ that is different from the $F_{LO}$ for the other bands. As depicted in FIG. 2A, a particular spot $F_{LO}$ frequency (e.g., 5.1029 GHz) is shown corresponding to a particular RF signal frequency (e.g., 36 GHz) within a particular radar band (e.g., Ka-band).

Within each of the signal paths depicted in FIGS. 2A-2D there is a respective set of components comprising various mixers and a frequency doubler arranged in a particular way. For each radar band signal path the respective set of components act together, along with the VCO 140, to achieve a composite local oscillator that functions similar to the linear sweep generator 60 of FIG. 1A. Thus, for each radar band, as $F_{LO}$ is controlled to sweep through its particular range of frequencies at a particular rate, the respective set of components act in concert with one another to function as a composite local oscillator that sweeps through a range of frequencies at a particular rate to produce an intermediate frequency (IF) signal, $F_O$, as input to a matched filter.

FIG. 2A depicts major components of the Ka-band signal path from the front antenna 102 of the radar signal detector of FIG. 1B. The sweep output $F_{LO}$ from the VCO 140 is doubled by a frequency doubler 142 and the second harmonic of this doubled frequency is mixed, at mixer M1F 108, with an incoming Ka-band 36 GHz signal. The first intermediate frequency is in the range of 15.5886 GHz and is mixed, at mixer M3 148, with the doubled $F_{LO}$ to produce a second intermediate frequency signal in the range of 5.3829 GHz. This second intermediate frequency signal is mixed, at mixer M4 162, with $F_{LO}$ to produce an output signal $F_O$ having an intermediate frequency in the range of 280 MHz. This signal is then propagated to the matched filter 170.

As mentioned, the sweep for Ka-band signals may sweep from 33.35 GHz to 36.08 GHz. Using the signal path of FIG. 2A, this sweep can be accomplished when $F_{LO}$ is swept from 4.7242 GHz to 5.1142 GHz.

Figure 2B:
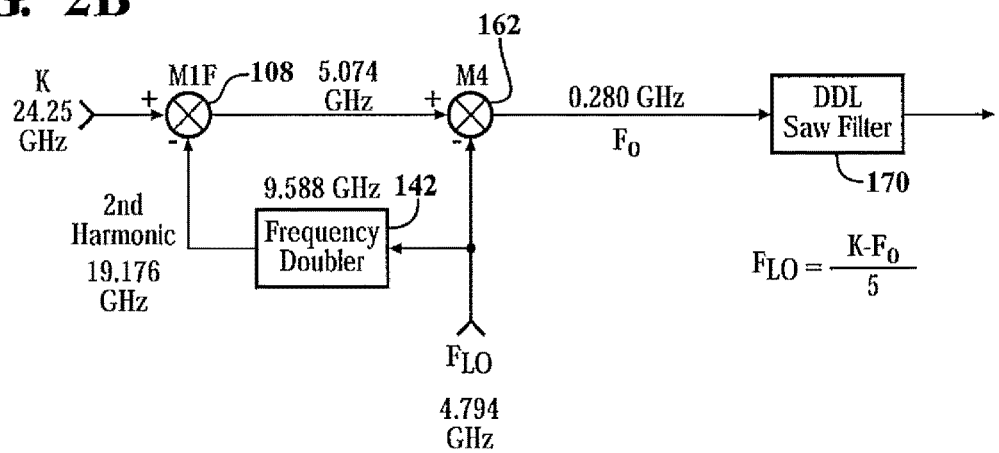
FIG. 2B depicts major components of the K-band signal path from the front antenna of the radar signal detector of FIG. 1B.

FIG. 2B depicts major components of the K-band signal path from the front antenna 102 of the radar signal detector of FIG. 1B. The sweep output $F_{LO}$ is doubled by the frequency doubler 142 and its second harmonic is mixed, at mixer M1F 108, with an incoming K-band 24.25 GHz signal. The output of the mixer M1F has an intermediate frequency of about 5.074 GHz and is mixed, at mixer M4 162, with $F_{LO}$ to produce an output signal $F_O$ having an intermediate frequency in the range of 280 MHz.

As mentioned, the sweep for K-band signals may sweep from 24.035 GHz to 24.265 GHz. Using the signal path of FIG. 2B, this sweep can be accomplished when $F_{LO}$ is swept from 4.751 GHz to 4.797 GHz.

Figure 2C:
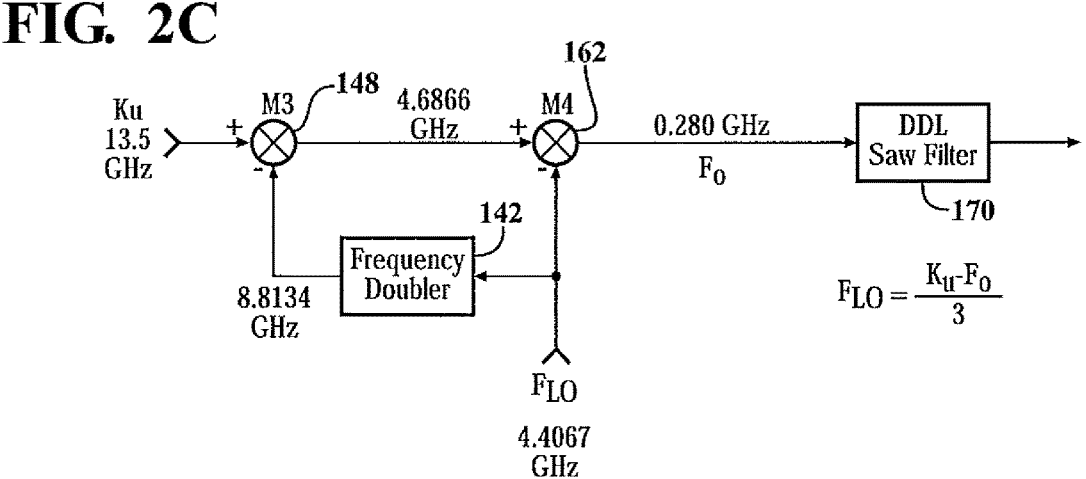
FIG. 2C depicts major components of the Ku-band signal path from the front antenna of the radar signal detector of FIG. 1B.

FIG. 2C depicts major components of the Ku-band signal path from the front antenna 102 of the radar signal detector of FIG. 1B. The sweep output $F_{LO}$ is doubled by the frequency doubler 142 and is mixed, at mixer M3 148, with an incoming Ku-band 13.5 GHz signal. The output of the mixer M3 has an intermediate frequency of about 4.6866 GHz and is mixed, at mixer M4 162, with $F_{LO}$ to produce an output signal $F_O$ having an intermediate frequency in the range of 280 MHz.

As mentioned, the sweep for Ku-band signals may sweep from 13.38 GHz to 13.52 GHz. Using the signal path of FIG. 2C, this sweep can be accomplished when $F_{LO}$ is swept from 4.3667 GHz to 4.4133 GHz.

FIG. 2D depicts major components of the X-band signal path from the front antenna 102 of the radar signal detector of FIG. 1B. The sweep output $F_{LO}$ is additively mixed, at mixer M2 122, with an incoming X-band 10.55 GHz signal to produce a first intermediate frequency signal in the range of 15.685 GHz. The sweep output $F_{LO}$ is also doubled by the frequency doubler 142 and is mixed, at mixer M3 148, with the first intermediate frequency signal. The output of the mixer M3 148 has an intermediate frequency of about 5.415 GHz and is mixed, at mixer M4 162, with $F_{LO}$ to produce an output signal $F_O$ having an intermediate frequency in the range of 280 MHz.

As mentioned, the sweep for X-band signals may sweep from 10.49 GHz to 10.56 GHz. Using the signal path of FIG. 2D, this sweep can be accomplished when $F_{LO}$ is swept from 5.105 GHz to 5.14 GHz.

As mentioned above, FIGS. 2A-2D are provided to illustrate an isolated signal path for each respective band of radar signals. In these figures, the various switches, amplifiers, and filters have been omitted for clarity and each of the signal paths happen to relate to the front antenna 102 of FIG. 1B. Similar distinct signal path diagrams can be constructed as well that relate to the rear antenna 138. To do so, FIGS. 2A-2D would be modified to use mixers that are in the signal paths related to the rear antenna 138. For the Ku-band and X-band, no modifications are needed; the same mixers are used regardless of whether the signal path relates to the front antenna 102 or the rear antenna 138. For the K-band and Ka-band, the mixer M1F 108 would be replaced with mixer M1R 130.

The matched filter 170, as mentioned, can be a dispersive delay line configured as a receiver filter. In an embodiment, the filter 170 can have a matched signal that is an up-chirp with a chirp rate of 3.5 MHz/μs. Accordingly, the sweep rate of $F_{LO}$ can be controlled so that an RF signal at the receiver input is down-converted to the IF and arrives with the matching 3.5 MHz/μs chirp rate. Thus, when the FPGA 176 determines the Ka-band using the front antenna 102 is the band of interest, it will control all the appropriate switches in FIG. 1B to define the Ka-band signal path and it will control the VCO 140 to produce a sweep signal $F_{LO}$ that matches the filter 170.

Figure 4C:
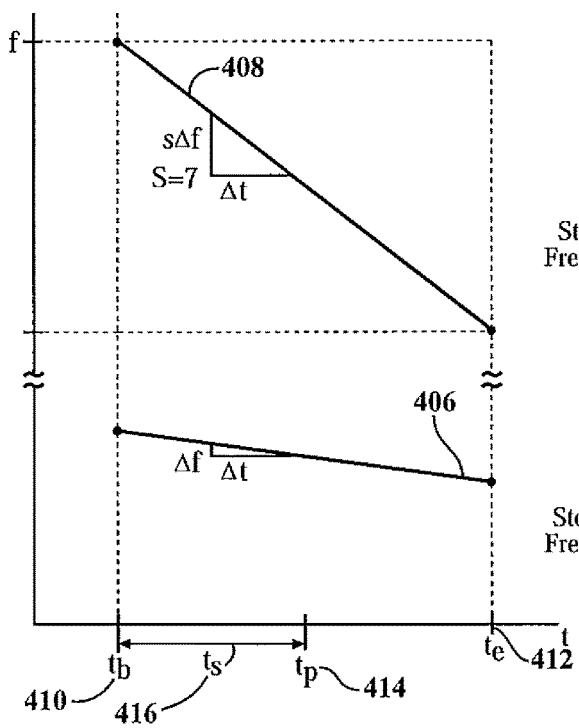
FIG. 4C depicts a graph of the frequency-to-time ratio of the swept local oscillator when sweeping through the KA-band in accordance with the principles of the present invention.

Using FIG. 2A as an example, the frequency $F_{LO}$ can be characterized as $$F_{LO} = \frac{Ka - F_O}{7}$$

where Ka=36 GHz and $F_O$=280 MHz, for example. Rearranging the terms reveals that $F_O$=Ka−7$F_{LO}$. Thus, any change in the local oscillator signal $F_{LO}$ is effectively multiplied by "7" when producing the sweep rate of the composite local oscillator that results in the output chirp $F_O$ at the IF frequency of 280 MHz. This can be visualized in FIG. 4C which depicts a graph of the frequency-to-time ratio of the swept local oscillator in accordance with the principles of the present invention. The line 406 represents the sweep local oscillator $F_O$ which has a slope, or chirp rate, of $\Delta f/\Delta t$. However, because of the way various multiples of $F_{LO}$ are mixed in the signal path of FIG. 2A, the effective chirp rate 408 of the composite local oscillator comprised of the set of components in the signal path of FIG. 2A is 7 times $\Delta f/\Delta t$. When the incoming 36 GHz signal is mixed with the composite local oscillator signal represented by 408 of FIG. 4C, a resulting $F_O$ signal is generated as input to the filter 170 and will have a center frequency at 280 MHz and be an up-chirp with a chirp rate of 3.5 MHz/µs. Embodiments of the present invention also contemplate slower chirp rates such as, for example, 0.15 MHz/µs and 2.85 MHz/µs and even chirp rates above 3.5 MHz/µs.

Thus, for the Ka-band the sweep local oscillator signal $F_{LO}$ is not simply swept at the down chirp rate of −3.5 MHz/µs. Instead, a sweep rate of $$\frac{-3.5 \text{ MHz}/\mu s}{7}$$

is used to produce a signal $F_O$ that is matched to the matching rate of the filter 170.

Accordingly, the $F_{LO}$ signal for the Ka-band is controlled by the FPGA 176 to sweep from a starting frequency to a stopping frequency at a specific sweep rate. The starting and stopping frequencies are selected to tune through the entire Ka-band and the sweep rate is selected to match the impulse response of the filter 170.

Figure 5:
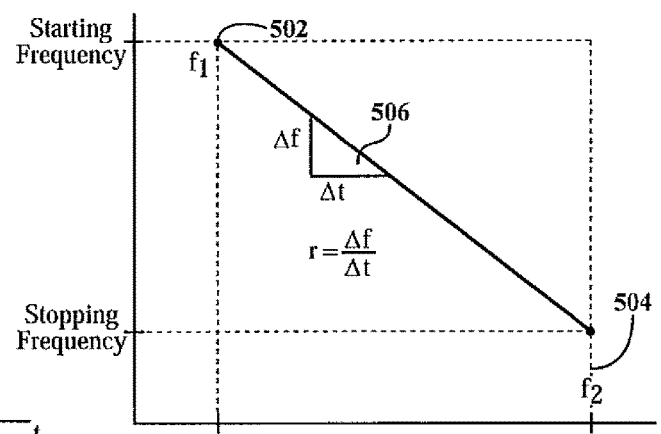
FIG. 5 depicts the general structure of the local oscillator waveform for a particular radar band sweep in accordance with the principles of the present invention.

As shown in FIGS. 2B-2C, a similar relationship between $F_{LO}$ and a received radar signal band can be determined for the other three bands such as, for example, by:

for the K-band: $F_{LO} = \frac{K - F_O}{5}$ for the Ku-band: $F_{LO} = \frac{Ku - F_O}{3}$ for the X-band: $F_{LO} = \frac{X - F_O}{2}$ This general structure for the $F_{LO}$ signal for each of the radar bands is the same and depicted in FIG. 5 as the line 506. When the FPGA 176 starts the sweep of a particular band, it will control the VCO 140 to start at a frequency 502, sweep at a particular chirp rate r=$\Delta f/\Delta t$, and stop at a frequency 504. The table below assumes the chirp rate for the composite local oscillator to be −3.5 MHz/µs however, as described above, the VCO 140 is controlled appropriately to produce a sweeping $F_{LO}$ for each band's signal path in order to achieve this composite chirp rate. The table below provides exemplary values for sweeping the four radar bands.

| RADAR BAND | VCO CHIRP RATE r | START FREQ $f_1$ | STOP FREQ $f_2$ | SWEEP TIME |
|---|---|---|---|---|
| Ka | $\frac{-3.5 \text{ MHz}/\mu s}{7}$ | 5.114 GHz | 4.724 GHz | ~780 µs |
| K | $\frac{-3.5 \text{ MHz}/\mu s}{5}$ | 4.797 GHz | 4.751 GHz | ~66 µs |
| Ku | $\frac{-3.5 \text{ MHz}/\mu s}{3}$ | 4.413 GHz | 4.367 GHz | ~40 µs |
| X | $\frac{-3.5 \text{ MHz}/\mu s}{2}$ | 5.138 GHz | 5.103 GHz | ~20 µs |

Since the sweep signal $F_{LO}$ from the VCO 140 is controlled with high accuracy, determining a timing of the detected pulse within the sweep duration establishes its frequency. In particular, with respect to FIG. 3D, the FPGA 176 determines that a pulse occurs at time T 306 relative to a sweep starting time of a particular sweep of $F_{LO}$ through one of the bands of interest. Such a sweep of $F_{LO}$ is depicted as line 406 in FIG. 4C. In particular, the sweep starts at a time $t_B$ 410 and ends at a time $t_E$ 412. During that sweep there is a point $t_P$ 414 that is the same distance $t_S$ 416 in time from $t_B$ 410 as the pulse time T 306 is from the sweep start time $t_B$ 410.

As shown in the above table, during the sweep of $F_{LO}$, the sweep begins at a starting frequency $f_1$ and ends at a stopping frequency $f_2$. The frequency of $F_{LO}$ at location $t_P$ 414 in the sweep is provided by:

instantaneous frequency of $F_{LO} = f_1 + (t_S \times r)$

This instantaneous value of $F_{LO}$ can then be used to determine the frequency of the radar signal that corresponds to that portion of the sweep of $F_{LO}$.

For example, if a particular sweep of $F_{LO}$ occurs for the X-band to produce an output pulse that is 10 µs after the beginning $t_B$ 410 of the sweep, then $t_S$ will equal 10 µs. Using the values $f_1$=5.114 GHz, $$r = \frac{-3.5 \text{ MHz}/\mu s}{2},$$

and $t_S$=10 µs, will determine that $F_{LO}$=5.1225 GHz. Using this instantaneous frequency for $F_{LO}$, the relationship of FIG. 2D $$\left(e.g., F_{LO} = \frac{X - F_O}{2}\right)$$

and $F_O$=250 MHz, will reveal a value of X=10.525 GHz. Thus, the timing T 306 of the detected output pulse provides an indication that the radar signal received at an antenna had a frequency of 10.525 GHz.

As mentioned above, there are four different frequency bands that can be swept through in order to detect possible radar gun signals. In addition to these FCC licensed radar bands, it is advantageous to examine other microwave frequencies to identify nuisance signals leaking from the local oscillators of other radar detectors operating in the vicinity (e.g. 32.55 GHz to 32.65 GHZ and 22.45 GHz to 23.79 GHz). If these nuisance signals can be identified, the false alarms they generate in Ka band may be suppressed. These problems and techniques for their amelioration are taught in U.S. Pat. No. 7,579,976, "SYSTEMS AND METHODS FOR DISCRIMINATING SIGNALS IN A MULTI-BAND DETECTOR" which is herein incorporated by reference in its entirety.

Additionally, in order to determine signal signatures that help differentiate nuisance signals from actual radar gun signals, the four different bands can be swept through multiple times during one complete "sweep" of the radar detector. Thus, the FPGA 176 can control the VCO 140 to sequentially produce appropriate sweep signals (according to the above table) to sweep through each of the four frequency bands. A sweep through all of the four bands can be accomplished in about 1 ms which allows an opportunity to perform multiple sweeps of the four bands within a 16 ms transmission window corresponding to some conventional brief-duration radar signal sources.

Figure 6:
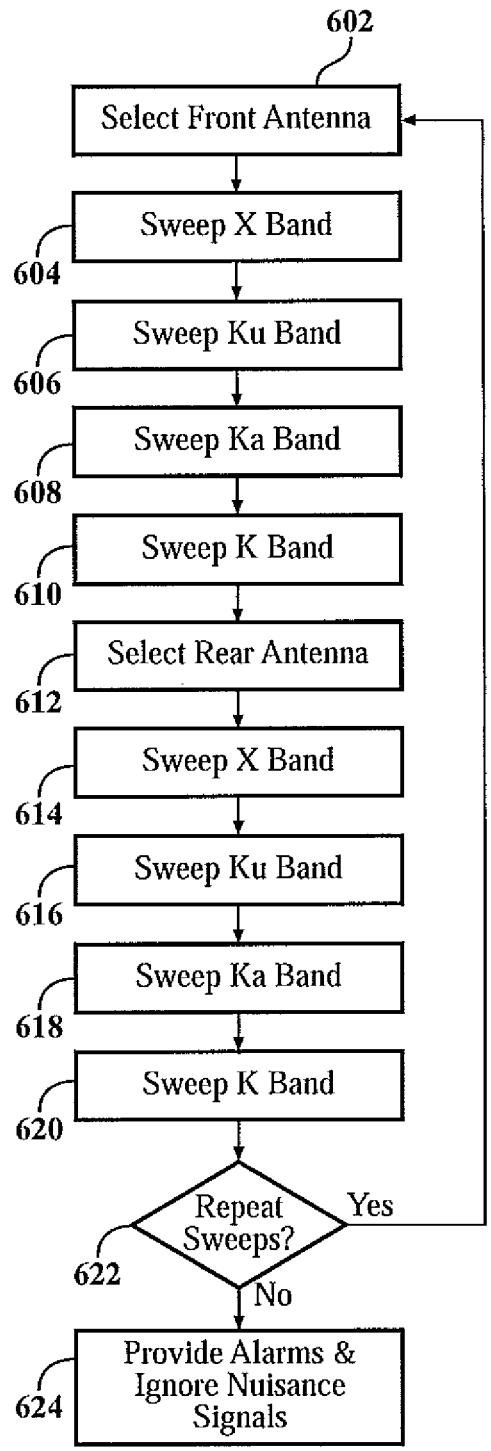
FIG. 6 depicts a flowchart of an exemplary sweep process in accordance with the principles of the present invention.

For example, FIG. 6 depicts a flowchart of an exemplary sweep process. The order in which a front or a rear antenna is selected (e.g., steps 602, 612) may vary without departing from the scope of the present invention. Similarly, the order in which the four different bands are swept (e.g., steps 604, 606, 608, 610) may vary as well. An example sweep may start, in step 602, by selecting one of the antennas, such as a front antenna. The VCO 140 can then be controlled to sequentially sweep through the X-band (step 604), the Ku-band (step 606), the Ka-band (step 608), and the K-band (step 610) as described in more detail above.

Once the four bands have been swept for the selected antenna, then the other antenna, such as the rear antenna, can be selected in step 612. Similar to the sweep using the front antenna, the four bands are sequentially swept in steps 614, 616, 618, and 620. Once the four bands have been swept for both the front and rear antenna, then a determination is made in step 622 if the sweeps should be repeated. For example, as described earlier, a sweep of all four bands can be accomplished in about 1 ms and, thus, a sweep for both the front and rear antenna can be accomplished in about 2 ms. If a shortest police radar transmission signal lasts about 16 ms, then about 6 or 7 sweeps of all four bands for both antennas can be repeated within that time frame. One of ordinary skill will recognize that the determination in step 622 of how many sweeps to repeat can vary without departing from the scope of the present invention.

Practical design considerations may reduce the number of sweeps that may theoretically be performed during a predetermined time period (e.g., 16 ms) when implementing the sweeping local oscillator. For example, when changing from one sweep rate for a particular band to another sweep rate for another band, the PLL 152 may have a settling time that can be accounted for. One way to account for the settling time is to start the VCO 140, for a particular band sweep, at a $F_{LO}$ frequency higher than the starting frequency $f_1$ shown in the above table. Following this practice ensures that the PLL loop has settled and the VCO 140 is accurately sweeping when the starting frequency $f_1$ is reached. For an example explored below, assume the required settling time is 10 μs; during this interval 35 MHz of RF spectrum will be swept.

The DDL SAW filter 170 also has an inherent delay, $D_T$, that is accounted for as well. Assume as an example this delay is 4 μs. During this delay 14 MHz of RF spectrum will be swept (for example, in the Ka-band). This delay can be compensated by sweeping 7 MHz before the highest RF frequency for that band and 7 MHz below the lowest RF frequency for that band. Further, to accommodate the PLL settling time mentioned above, an additional 35 MHz can be incorporated above the nominal start of the band, totaling 42 MHz adjustment of the starting point of the RF sweep. Continuing the numerical example, the Ka-band may have a high-end RF frequency of 36.08 GHz and a low-end frequency of 33.35 GHz. To accommodate the delays described above, the sweep generating hardware can be designed to target 36.122 GHz and 33.343 GHz as the start and end points of the RF sweep.

Accounting for the settling time of the PLL 152 and the delay of the filter 170 plus some "programming overhead" that may be associated with the time required to load control settings into the reference generator 156 may result in a complete sweep of both front and rear antennas taking about 3 ms. Even with this longer sweep period, the detector of FIG. 1B can complete about 5 of these full sweeps in a 16 ms time period.

Once all the sweeps have been accomplished, then, in step 624, the detector can provide alarms if a police radar signal was detected and can also ignore any nuisance signals that, even though detected, do not correspond to actual police radar signals.

One known issue with using a mixer in super-heterodyne receivers for combining a desired RF signal and a local oscillator signal to produce an intermediate frequency signal, is that of image signals that interfere with receiving and detecting the desired RF signal. Because a radar detector sweeps a spectrum far larger than the final IF center-frequency, in the presence of a strong signal it is almost inevitable that the detector must contend with a spurious final IF image response. An example will illustrate: Assume a strong radar signal at 35.0 GHz and an equivalent LO at 34.72 GHz, yielding the desired receiver response: 35.0−34.72=0.28 GHz. But the detector's LO will also be swept through 35.28 GHz, yielding 35.0−35.28=−0.28 GHz, i.e. the receiver's IF image. Thus, the strong 35 GHz signal will be seen a second time, but erroneously. Obviously, it is beneficial to design the detector so that this undesired image signal is attenuated sufficiently.

One of ordinary skill will recognize that there are traditional image signal rejection techniques that can be used to filter image signals prior to the final mixer M4 162 (or more generally, before the mixer 54 of FIG. 1A). However, the characteristics of the DDL SAW filter 170 provide additional techniques for rejecting image signals.

Assuming, for example, that the DDL filter has delay length of 4 μs and a characteristic chirp rate of $3.5 \times 10^{12}$ Hz/s, then its bandwidth is approximately (4 μs*3.5 MHz/μs)=14 MHz. If the filter is presented with an up-chirp at the characteristic rate, its resulting output is a narrow pulse lasting a few tens of nanoseconds. Conversely, if presented with a down-chirp, the filter expands rather than compresses the duration of its output. More specifically, if presented with a $3.5 \times 10^{12}$ Hz/s down-chirp (e.g. the "image chirp" produced when the receiver sweeps through the IF image), the filter output will last about 8 μs, twice the filter's delay length, and about 28 MHz of spectrum is swept during this interval.

Figure 7:
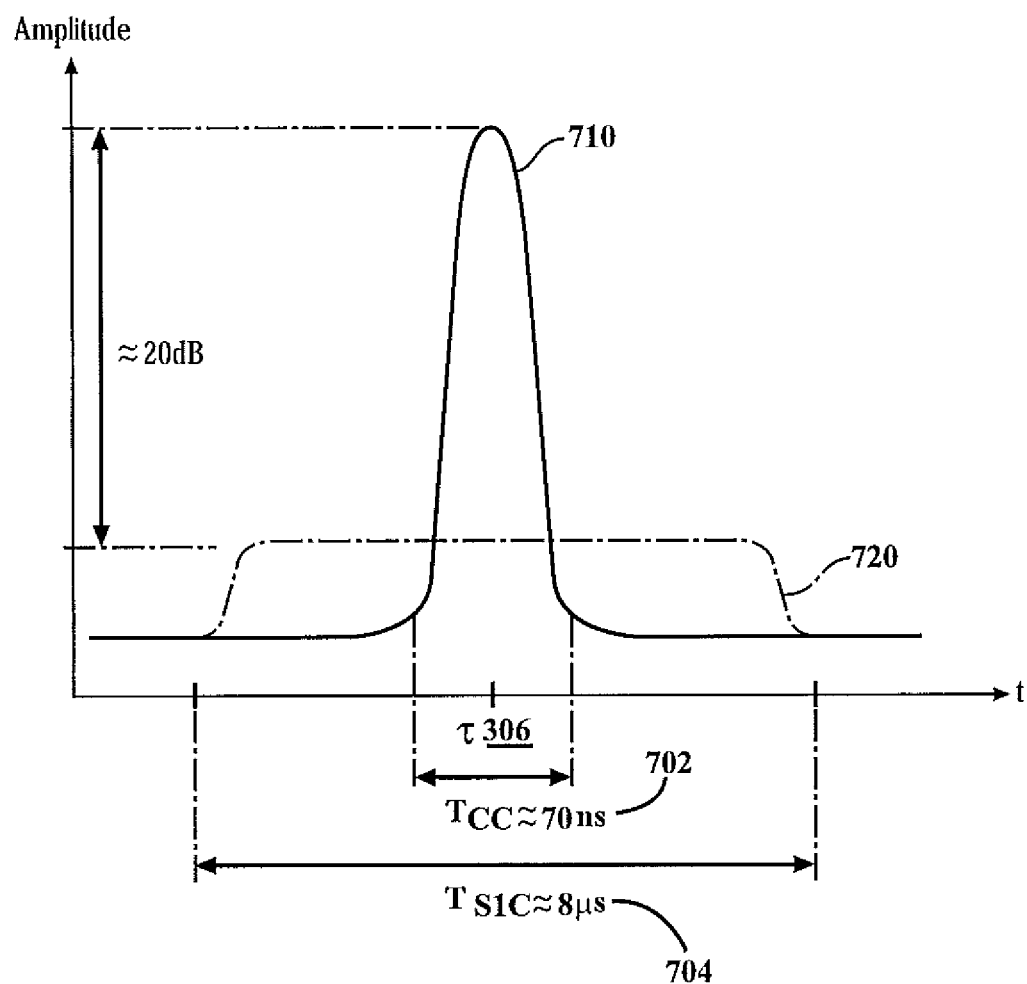
FIG. 7 depicts representative signal shapes for a detected RF signal and an undesired image signal.

The result is that the DDL filter inherently enhances the S/N ratio of correctly-chirped signals but attenuates chirp images by dispersing the energy, typically yielding more than 20 dB rejection of image chirps. This phenomenon is depicted in FIG. 7 which overlays a strong desired compressed chirp 710, having a width $T_{cc}$ 702, with the dispersed response 720 arising from reception of an image chirp and having a width of $T_{SIC}$ 704. It should be noted the receiver and DDL filter are linear elements so that image suppression prior to the final mixer and chirp-image suppression inherent in the DDL are independent contributors to image suppression. Additional post-demodulation image attenuation is possible after the demodulating logarithmic amplifier by virtue of the marked difference in pulse width of the desired response ($T_{cc}$~70 ns) versus the image pulse width ($T_{SIC}$~8 μs). This additional filtering may be implemented with analog techniques and/or digitally within FPGA algorithms. Each of these image suppression mechanisms combines to improve image signal rejection.

Figure 8A:
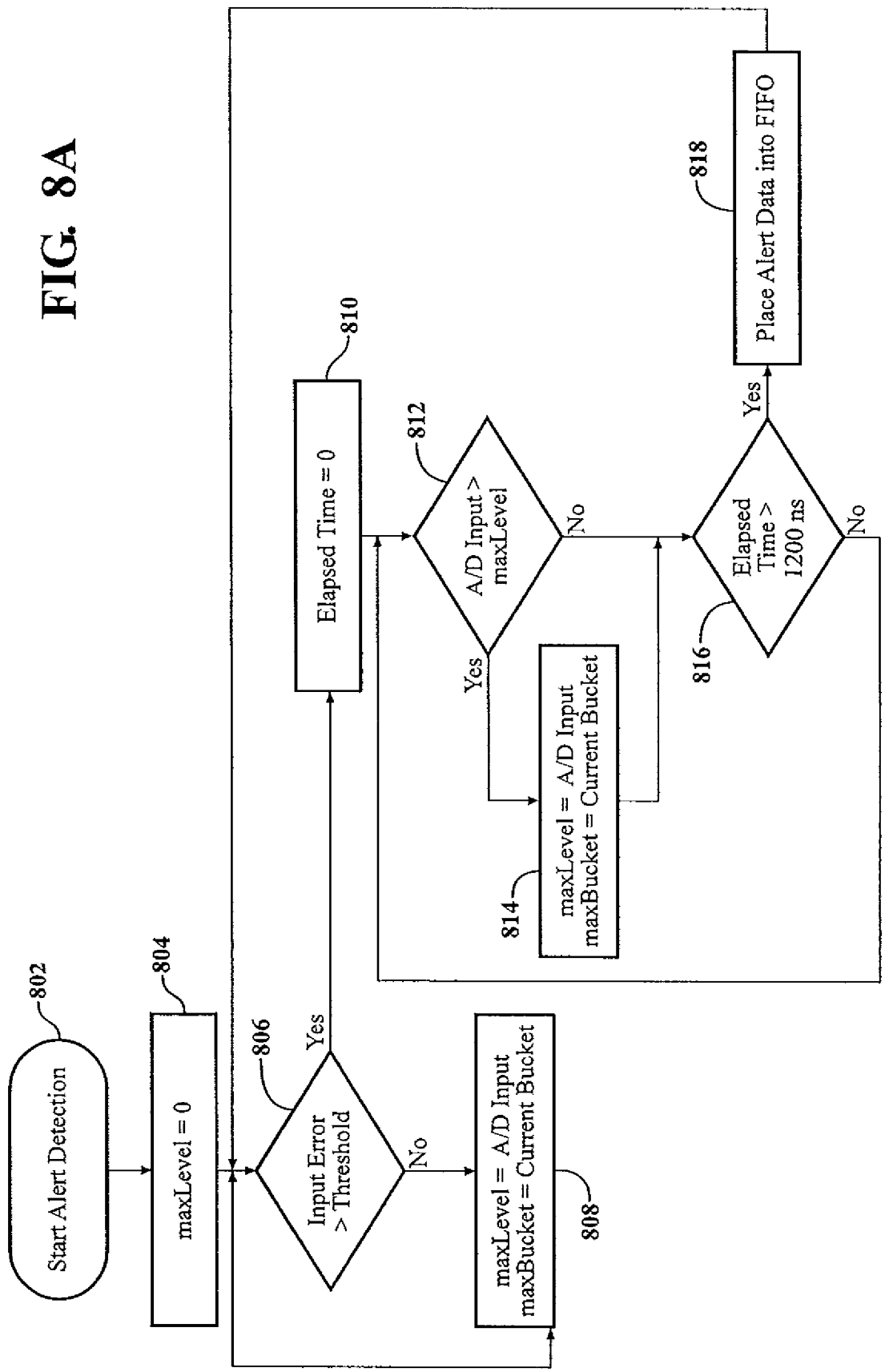
FIG. 8A depicts a flowchart of an exemplary process to implementing a fixed detection window in accordance with the principles of the present invention.

FIG. 8A depicts a flowchart of an exemplary process to implement a fixed detection window in accordance with the principles of the present invention. As mentioned earlier, the output from the filter 170 is received by an amplifier 172 that provides input to an analog-to-digital converter 174. The FPGA 176 samples the output of the A/D converter 174 in time periods that can conveniently be referred to as "buckets" such that during a particular bucket, the FPGA 176 determines an input value of the digital signal provided by the A/D converter 174. Buckets can be sequentially numbered so that when the time period for bucket n is finished, the FPGA 176 can begin sampling the input from the A/D converter 174 for bucket n+1. If the time period is known for each bucket and the bucket number is reset at the start of the sweep, the bucket number can be used to calculate the time since the sweep start using the formula $$t_s = n \times t_{bucket}$$

where n is the bucket number and $t_{bucket}$ is the period of one bucket. Once the time since the sweep start, $t_s$, is known, the techniques described above can be used to calculate the instantaneous frequency. Therefore, the bucket can be used to determine the detected frequency during the detection process.

The overall process of FIG. 8A describes one possible detection routine that can be performed by the FPGA 176 during a sweep of one of the four radar frequency bands. In particular the routine for one band can have a starting step 802 along with an initialization of a detected input value in step 804. Once the routine is started, the input value (to the FPGA 176) from the digital output of the A/D converter 174 is determined by the FPGA 176. More particularly, the FPGA 176, in step 806, calculates a difference between the input value and a noise floor to determine what is referred to as an "Input Error" value. If the "Input Error" value is greater than a predetermined threshold, then a desired signal is likely being detected and control passes to step 810. If the "Input Error" value does not exceed the predetermined threshold, then control passes to step 808.

In step 808, the FPGA 176 can set a variable "maxLevel" to be the value of the currently sampled input from the A/D converter 174. Also, a variable "maxBucket" can be set to the value of the current bucket number. Control can then loop back to step 806, where the input from the A/D converter 174 is once again analyzed to determine if a detected signal is likely present.

Once a likely signal is detected, a timer is started in step 810 and a determination is made in step 812 whether the value in the current bucket (i.e., the input from the A/D converter 174) is greater than the "maxLevel". As the loop of FIG. 8A is repeated, the value of "maxLevel" will be set to the largest value received as input from the A/D converter 174 and the value of "maxBucket" will be set to the bucket number that corresponds to the largest value received. Thus, if the value in the current bucket is larger than the current value of "maxLevel", the FPGA 176, in step 814, will replace the value for "maxLevel" with the current A/D input value and replace "maxBucket" with the number of the current bucket.

If the current A/D input is not greater than "maxLevel" or once the "maxLevel" and "maxBucket" values are set, control passes to step 816 where the FPGA 176 determines if 1200 ns has elapsed (e.g., a detection window) since the timer was started in step 810. If no, then control loops back to step 812 to test the current A/D input value. During the time taken to return to step 812, a new bucket value and bucket number may have occurred.

Once the timer has elapsed, according to step 816, the FPGA 176, in step 818, places an alert in a queue to possibly be delivered to the user interface 178. Thus, according to the flowchart of FIG. 8A, the FPGA 176 starts a 1200 ns window once the A/D input exceeds a predetermined threshold and within that 1200 ns window, the FPGA 176 determines a maximum value that occurred and the time period (i.e., bucket) in which it occurred. Accordingly, the alert has both a signal strength and a timing tag associated with it.

One of ordinary skill will appreciate that the example 1200 ns detection window can be changed without departing from the scope of the present invention and may, for example, vary based on the shape of the sinc pulse 304 shown in FIG. 7A. Thus, this detection window can have a duration that captures a desired number of side-lobes 712, 714 and ignores the rest. Also, the test in step 816 can be replaced by a predetermined threshold related to a value of the input from the A/D converter 174. Thus, rather than having a fixed time duration for a detection window, the FPGA 176 could monitor the signal input from the A/D converter 174 until that input signal drops below a predetermined threshold value.

The FPGA 176 repeats the routine of FIG. 8A for each of the four radar bands of interest (and for each of the front and rear antennas). Thus, for each band the FPGA 176 can determine if an alert occurred and also determine for each alert an amplitude of a detected peak signal and when that peak signal occurred. As discussed above with respect to FIG. 4C, the time when the peak signal occurred (e.g., time $t_p$ 414 of FIG. 4C) reveals the frequency of that peak signal. Accordingly, the FPGA 176 can construct, for each sweep of the four radar bands, a snapshot of what alerts were detected. Because multiple sweeps of the four bands can occur in a particular time period (e.g., 16 ms), a respective snapshot for each sweep of the four bands can be constructed each time a sweep of the four bands is performed (see FIG. 6, step 622).

The FPGA 176 and/or microprocessor 180 can then compare the different snapshots for each of the sweeps to determine which alerts likely correspond to police radar signals and which alerts likely correspond to nuisance signals that can be ignored. Nuisance signals can include, for example, park-assist systems, automatic cruise control radar systems, and harmonics emitted by nearby radar detectors. U.S. Pat. No. 5,852,417 describes a variety of nuisance signals and techniques for discriminating them from detected signals corresponding to actual police radar and is incorporated herein by reference.

For example, police radar sources typically emit a signal having a fixed fundamental frequency within their respective band of operation. While many other signal sources emit at a fundamental frequency, they may also emit at harmonic frequencies as well. Thus, the FPGA 176 may detect the presence of a signal at a particular frequency, $f_x$, within one of the bands. Using the snapshots of the different sweeps through the bands, the FPGA 176 can also determine if signals at multiples of $f_x$ (e.g., $2f_x$, $3f_x$, etc.) were also detected. If signals at harmonic frequencies of $f_x$ were also detected, then the source of the $f_x$ signal is likely not a radar gun and an alert at the frequency $f_x$ can be ignored.

Because a snapshot of the approximately 3 GHz of spectrum of the four radar bands can be generated in about 3 ms, a single snapshot can capture the occurrence of a nuisance signal and its harmonics even if that nuisance signal is short-lived. Also, a nuisance signal and its accompanying harmonic signals may typically rise and fall at approximately the same time and, therefore, it is beneficial to be able to sweep through a range of frequencies sufficiently fast enough to detect the occurrence of these multiple signals. Thus, in discriminating signals to identify alerts which likely correspond to actual police radar sources, the FPGA 176 can compare data within a snapshot of the swept four radar bands and can compare data within the multiple snapshots of the four swept radar bands.

Additionally, because it is desirable to detect police radar signals as far from the police radar gun as possible, the signals of interest may be subject to significant multipath fading. In such instances, a signal received by the detector will vary greatly in intensity over a relatively short time period. Thus, when the detector is tuned to receive a particular frequency, the received signal at that frequency may have a negligible amplitude and when the received signal has a detectable amplitude, the detector may no longer be tuned to the appropriate frequency. According to the process described with respect to FIG. 6, the speed at which each sweep of a radar band occurs and the repeated number of sweeps improve the likelihood that even a signal suffering from multipath fading can be more reliably detected because the detector will more likely be tuned to detect the received signal during one or more periods at which the received signal exhibits a detectable amplitude.

Thus, each respective snapshot can be thought of as a virtual image of the signal environment represented by the received electromagnetic signals. Rather than relying on only different sweeps of various bands of the electromagnetic signal environment that can occur at a rate that is relatively large as compared to the duration of some of the detected radar signals, the snapshot, or virtual image, provides information about all the swept bands in a timeframe that is beneficial for detecting short-duration radar signals and/or various nuisance signals.

Figure 8B:
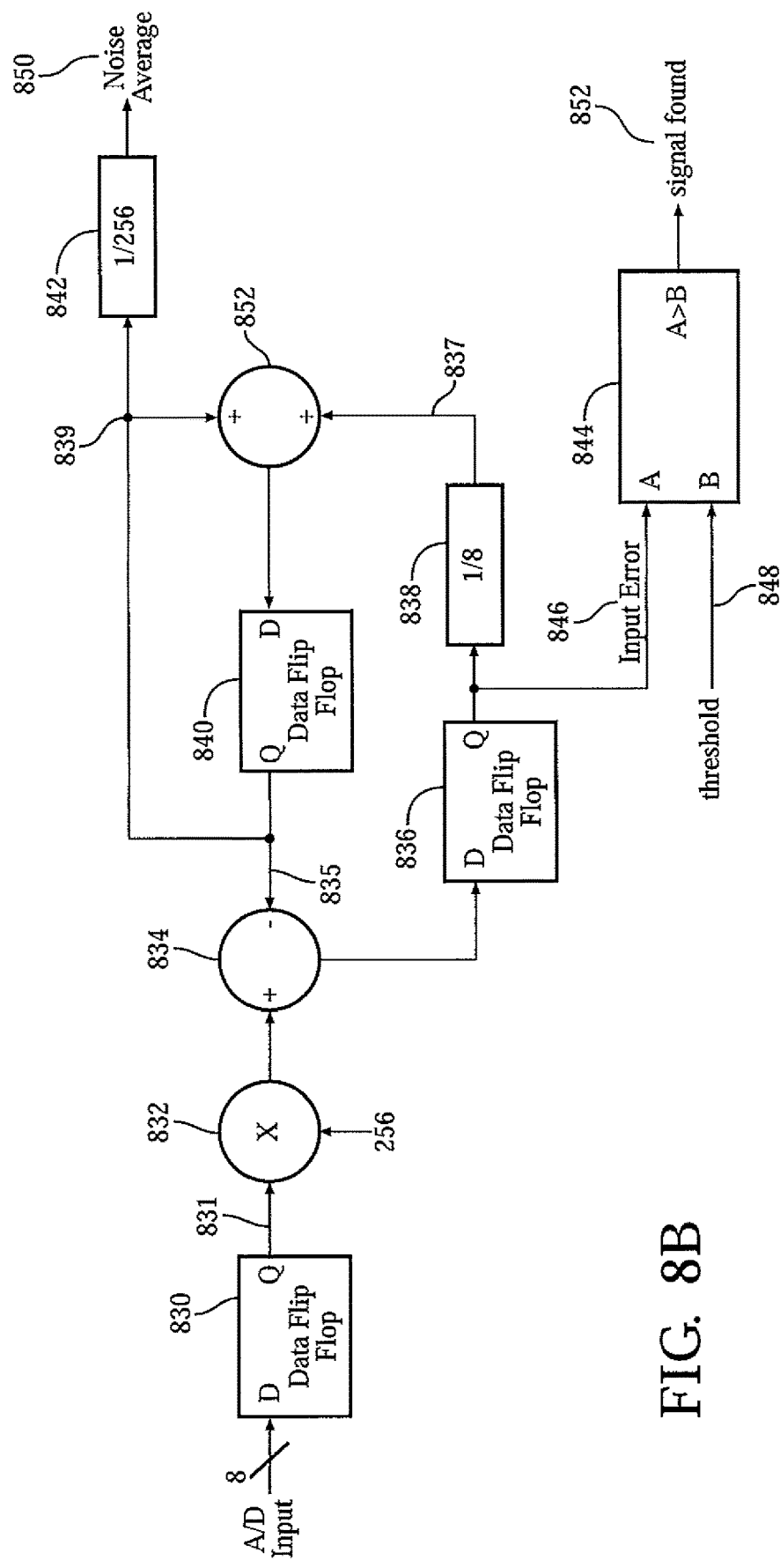
FIG. 8B depicts a block level diagram of utilizing a dynamically adjusted noise floor in accordance with the principles of the present invention.

FIG. 8B depicts a block level diagram of utilizing a dynamically adjusted noise floor in accordance with the principles of the present invention. In particular, a current value output from the A/D converter 174 is provided to a data flip flop (DFF) 830. The output 831 from the DFF 830 is multiplied by 256 and then is provided to an adder 834. The adder 834 subtracts a noise-related value 835 from the output value of the multiplier 832. The output from the adder 834 is passed through a DFF 836 to be one of the input values 846 of a comparator 844. The input value 846 reflects a difference between the output from the multiplier 832 and a noise-related value, and can be referred to as "Input Error" as noted above. The noise-related value 835 can be referred to as a "Noise Floor".

One exemplary noise-related value 835 is shown in FIG. 8B, in which the "Input Error" is first divided by 8, by block 838, and then summed with a previous value 839 of itself using the adder 852. The value 839 can be divided by 256 by block 842 and may represent a running average of the noise present in the signal received as input from the A/D converter 174.

Returning to the comparator 844, the other input value to the comparator 844 is a predetermined threshold value 848. If the "Input Error" 846 is greater than the predetermined threshold value 848, then a signal found value 852 is output from the comparator 844. This signal found value 852 is equivalent to the test analysis of step 806 in FIG. 8A. The components depicted in FIG. 8B may implement a signal detection technique which relies on a dynamically derived noise floor such that a signal is detected only when an input signal value is greater than the dynamically calculated noise floor by at least a predetermined amount.

In practice, the emitter circuitry of a police radar gun does not instantly turn on at a desired frequency. Instead, due to thermal expansion transients, the typical initial emission from the radar gun is at a higher frequency which ramps down quickly to its desired frequency of operation. This phenomenon can be captured by a radar detector operating in accordance with the principles of the present invention.

Figure 9:
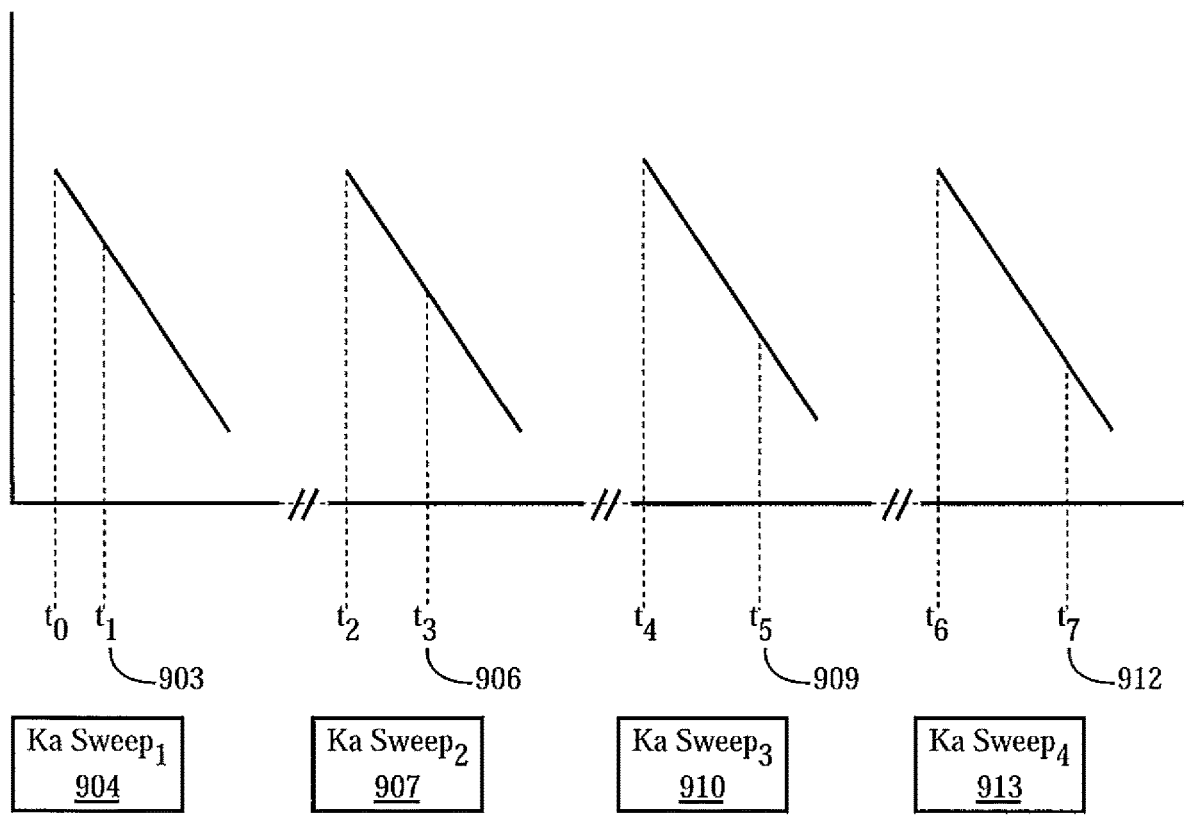
FIG. 9 depicts what the activation of a radar gun may look like when detected in accordance with the principles of the present invention.

In particular, if four combined sweeps through four different radar bands constitute a full sweep cycle for an antenna (e.g., a front antenna), then activation of the emitter circuitry of a radar gun can potentially be detected in each of the four different sweep cycles. FIG. 9 depicts what a detected signal of the activation of a Ka band radar gun may look like; it shows detected signals from four different Ka sweeps on a single time line. During the first sweep 904, a detected signal is determined to occur at $t_1$ 903 which corresponds to a particular frequency. Similarly a second signal is detected during the second sweep 907 at $t_3$ 906, a third signal is detected during a third sweep 910 at $t_5$ 909, and a fourth signal is detected during a fourth sweep 913 at $t_7$ 912.

The FPGA 176 and/or microprocessor 180 can include signal analysis routines that recognize the pattern of these four signals as potentially representing the operation of a police radar gun even though the radar gun has yet to emit a radar signal at its desired frequency.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of operating a police radar detector to suppress nuisance radar alerts due to received signals that are not police radar signals, said method comprising:
   receiving electromagnetic signals from a first antenna;
   mixing received electromagnetic signals with a local oscillator signal that is swept at a constant sweep rate to produce an output signal, the output signal comprising a respective snapshot of each of a plurality of separate frequency bands;
   based on the output signal, accumulating a virtual image of a signal environment represented by the received electromagnetic signals, the virtual image capturing at least 3 GHz of spectrum bandwidth within 3 ms;
   analyzing said virtual image for signals suspected of being nuisance signals that could result in nuisance radar alerts;
   identifying nuisance signals within said virtual image; and
   ignoring identified nuisance signals.

2. A method as claimed in claim 1 wherein identifying nuisance signals within said virtual image comprises identifying signals which have one or more harmonic companions.

3. A police radar detector for suppressing nuisance radar alerts due to received signals that are not police radar signals, said detector comprising:

a receiver configured to receive electromagnetic signals;

a mixer configured to combine received electromagnetic signals with a local oscillator signal that is swept at a constant sweep rate to produce an output signal, the output signal comprising a respective snapshot of each of a plurality of separate frequency bands;

a memory configured to store a virtual image of a signal environment, based on the output signal, represented by the received electromagnetic signals, the virtual image capturing at least 3 GHz of spectrum bandwidth within 3 ms;

a signal analyzer, coupled with the memory, and configured to analyze said virtual image for signals suspected of being nuisance signals that could result in nuisance radar alerts;

the signal analyzer configured to identify nuisance signals within said virtual image; and an alarm coupled with the signal analyzer and configured to ignore identified nuisance signals.

4. The detector of claim 3, wherein the signal analyzer is configured to identify nuisance signals within said virtual image by identifying signals which have one or more harmonic companions.

\* \* \* \* \*